United States Patent
Sumita et al.

(10) Patent No.: US 11,172,081 B2
(45) Date of Patent: Nov. 9, 2021

(54) INFORMATION PROCESSING APPARATUS, CONTROL METHOD, AND NON-TRANSITORY COMPUTER-READABLE STORAGE MEDIUM THAT DISPLAYS AN AUTHENTICATION INFORMATION INPUT SCREEN AFTER A COMMUNICATION APPARATUS PRINTS THE AUTHENTICATION INFORMATION

(71) Applicant: CANON KABUSHIKI KAISHA, Tokyo (JP)

(72) Inventors: Chisei Sumita, Tokyo (JP); Daiki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/829,121

(22) Filed: Mar. 25, 2020

(65) Prior Publication Data
US 2020/0314263 A1 Oct. 1, 2020

(30) Foreign Application Priority Data
Mar. 29, 2019 (JP) .............. JP2019-068065

(51) Int. Cl.
| | |
|---|---|
| H04N 1/00 | (2006.01) |
| H04W 76/14 | (2018.01) |
| H04W 4/80 | (2018.01) |
| H04N 1/44 | (2006.01) |
| H04M 1/725 | (2021.01) |
| H04M 1/72412 | (2021.01) |
| H04L 29/08 | (2006.01) |

(52) U.S. Cl.
CPC .... H04N 1/00395 (2013.01); H04M 1/72412 (2021.01); H04N 1/00411 (2013.01); H04N 1/00477 (2013.01); H04N 1/4426 (2013.01); H04W 4/80 (2018.02); H04W 76/14 (2018.02); *H04L 67/16* (2013.01)

(58) Field of Classification Search
CPC ........... H04N 1/00395; H04N 1/00411; H04N 1/00477; H04N 1/4426; H04W 76/14; H04W 4/80; H04M 1/72412; H04L 67/16
USPC ....................................................... 358/1.13
See application file for complete search history.

(56) References Cited

U.S. PATENT DOCUMENTS

| | | | |
|---|---|---|---|
| 10,462,328 B2 | 10/2019 | Iwahara et al. | |
| 2005/0116026 A1* | 6/2005 | Burger | G06Q 20/3676 235/380 |
| 2010/0020355 A1* | 1/2010 | Imai | G06F 21/608 358/1.15 |
| 2015/0193183 A1* | 7/2015 | Ichikawa | H04N 1/00307 358/1.15 |

(Continued)

FOREIGN PATENT DOCUMENTS

JP 2016-107612 A 6/2016

*Primary Examiner* — Allen H Nguyen
(74) *Attorney, Agent, or Firm* — Venable LLP (57) ABSTRACT

An information processing apparatus confirms whether a communication apparatus has completed output of predetermined information used to execute predetermined processing between the information processing apparatus and the communication apparatus, and causes a display to display a screen used to start the predetermined processing based on confirming that the communication apparatus has completed the output of the predetermined information.

17 Claims, 5 Drawing Sheets

(56) References Cited

U.S. PATENT DOCUMENTS

2016/0253651 A1* 9/2016 Park .................. G07F 9/023
  705/39
2016/0316511 A1* 10/2016 Suzuki ................ H04W 4/80
2017/0286026 A1* 10/2017 Ito .................... H04W 12/062
2017/0310848 A1 10/2017 Iwahara et al.

* cited by examiner

FIG. 2

```
SERVICE
00000000-0000-1000-1000-00405f9b34fb
    CHARACTERISTIC
    00000000-0000-2000-1000-00405f9b34fb
        DESCRIPTOR
        00000000-0000-2000-1000-00405f9b3400
```

INFORMATION PROCESSING APPARATUS, CONTROL METHOD, AND NON-TRANSITORY COMPUTER-READABLE STORAGE MEDIUM THAT DISPLAYS AN AUTHENTICATION INFORMATION INPUT SCREEN AFTER A COMMUNICATION APPARATUS PRINTS THE AUTHENTICATION INFORMATION

BACKGROUND OF THE INVENTION

Field of the Invention

The present invention relates to a technique of improving user convenience in processing executed between two apparatuses.

Description of the Related Art

As a low power consumption standard of Bluetooth®, a Bluetooth Low Energy (to be referred to as "BLE" hereinafter) standard has been developed. In the BLE standard, a communication apparatus intermittently broadcasts an advertising packet, thereby notifying another communication apparatus existing on the periphery of the existence of the self-apparatus. After the other communication apparatus receives the broadcast advertising packet, communication between the communication apparatus and the other communication apparatus is performed in accordance with Generic Attribute Profile (to be referred to as "GATT" hereinafter) communication processing. Additionally, in the BLE standard, a method of authenticating a communication apparatus is shown. When authentication is performed between communication apparatuses that perform communication, and pairing is performed, communication data can be encrypted. This makes it possible to more securely perform data communication. Japanese Patent Laid-Open No. 2016-107612 describes a method for executing pairing between a portable terminal and a printing apparatus that does not have a display function of displaying information. User input may be needed for processing such as pairing, and a time-out time may be set at that time.

In processing with time-out, user convenience lowers.

SUMMARY OF THE INVENTION

The present invention provides a technique of improving user convenience.

According to one aspect of the present invention, there is provided an information processing apparatus comprising: one or more processors; and one or more memories that stores a computer-readable instruction that causes, when executed by the one or more processors, the information processing apparatus to: confirm whether a communication apparatus has completed output of predetermined information used to execute predetermined processing between the information processing apparatus and the communication apparatus; and cause a display to display a screen used to start the predetermined processing based on confirming that the communication apparatus has completed the output of the predetermined information.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

(Arrangement of Communication System)

Figure 1:
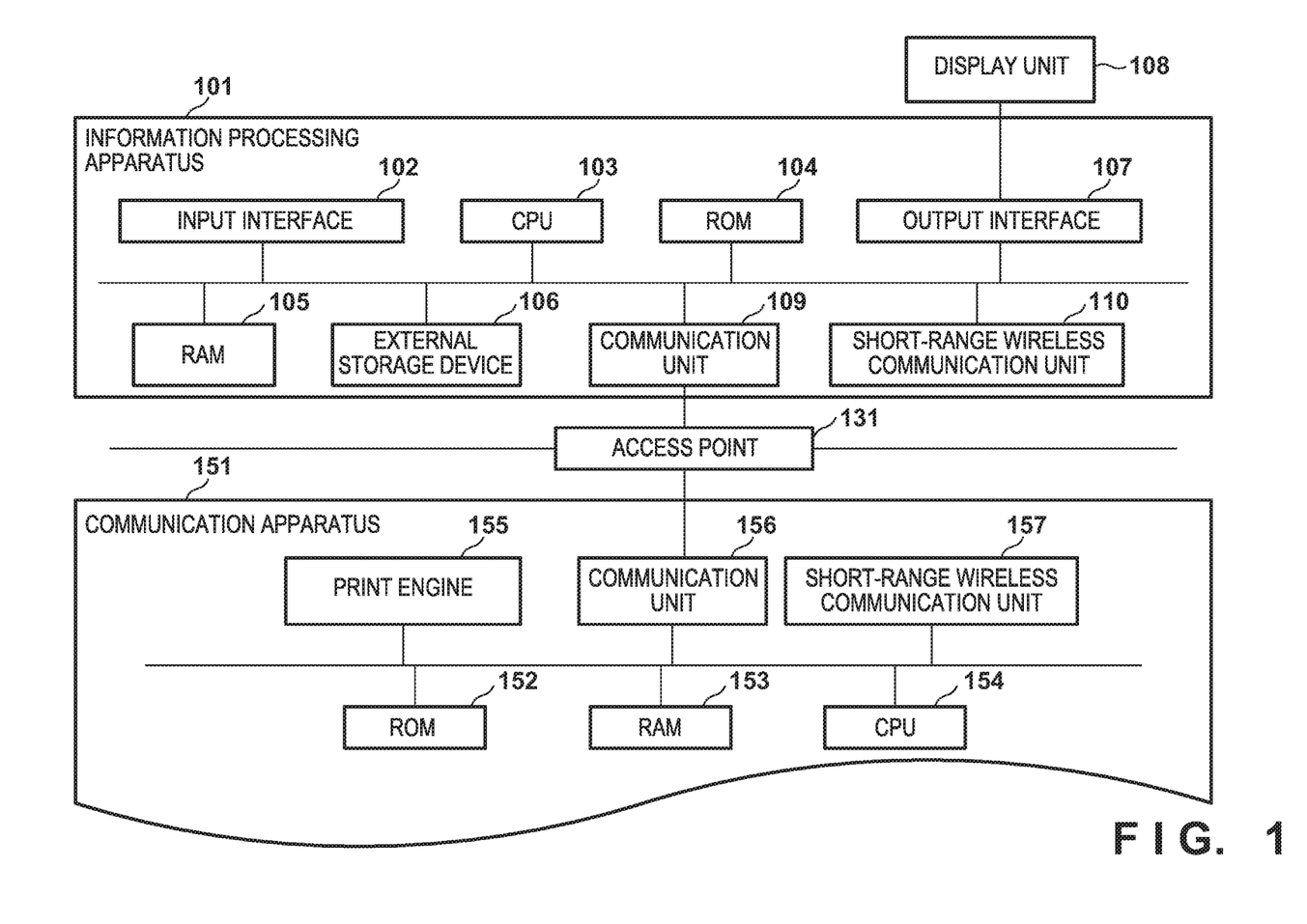
FIG. 1 is a block diagram showing an arrangement example of apparatuses in a communication system.

FIG. 1 shows an example of a communication system and the arrangement of apparatuses in the system according to this embodiment. The communication system is formed by, for example, an information processing apparatus 101, an access point 131, and a communication apparatus 151. The information processing apparatus 101 is an arbitrary information processing apparatus such as, for example, a smartphone, a mobile phone, a notebook PC (personal computer), a tablet terminal, a PDA (personal digital assistant), a digital camera, or the like. Assume that the information processing apparatus 101 is a smartphone hereinafter. Also, although the communication apparatus 151 is, for example, a printer, it can also be an electronic device of another type if it is capable of executing wireless communication with the information processing apparatus 101. The communication apparatus 151 may be, for example, an apparatus having an information display function that may need a relatively long time when presenting pairing information to a user, such as a printing function. Note that if the communication apparatus 151 is a printer, the printing method is not particularly limited, and various printing methods such as an inkjet method, a laser beam method, and a thermal transfer method can be used.

The information processing apparatus 101 includes, in one example, an input interface 102, a CPU 103, a ROM 104, a RAM 105, an external storage device 106, an output interface 107, a communication unit 109, and a short-range wireless communication unit 110. Note that these blocks are connected to each other by, for example, an internal bus. CPU, ROM, and RAM are acronyms for central processing unit, read-only memory, and random access memory, respectively. Also, although it is illustrated as if a display unit 108 (external display device) is present outside the information processing apparatus 101 in FIG. 1, the display unit 108 may be an information presenting device such as a display or the like incorporated in the information processing apparatus 101. Note that the arrangement of these blocks is merely an example, and blocks other than those shown in FIG. 1 may be included in the information processing apparatus 101. In addition, a plurality of blocks in FIG. 1 may be integrated into a single block or a single block may be divided into two or more blocks. That is, the information processing apparatus 101 can have an arbitrary arrangement within the range in which processing to be described below can be executed.

The CPU 103 is a system control unit and controls the overall information processing apparatus 101. The ROM 104 stores permanent data such as control programs, data tables, an embedded OS (operating system) program, and the like to be executed by the CPU 103. In this embodiment, each control program stored in the ROM 104 is used to perform software execution control such as scheduling, task switching, interrupt processing, and the like under the management of the embedded OS stored in the ROM 104. The RAM 105 is formed from, for example, an SRAM (static RAM) requiring a backup power supply. Note that since data is held by a primary battery for data backup (not shown), the RAM 105 can store data such as program control variables and the like without volatilizing them. A memory area that stores the setting information of the information processing apparatus 101, the management data of the information processing apparatus 101, and the like is also arranged in the RAM 105. The RAM 105 is also used as the main memory and the work memory of the CPU 103. The external storage device 106 stores an application that provides a print execution function. The external storage device 106 also stores various kinds of programs such as a print information generation program for generating print information interpretable by the communication apparatus 151 and an information transmission/reception control program for exchanging information with the communication apparatus 151 which is connected via the communication unit 109 or the short-range wireless communication unit 110. The various kinds of information to be used by these programs and image data obtained from other information processing apparatuses or the internet via the communication unit can be stored in the external storage device 106.

The input interface 102 is an interface for accepting data inputs and operation instructions from a user and is formed from a physical keyboard, buttons, and the like. The output interface 107 is an interface that performs control to cause the display unit 108 to display data and perform notification of the state of the information processing apparatus 101. The display unit 108 is formed from an LED (light emitting diode), LCD (liquid crystal display), and the like, displays data, and performs user notification processing of the state of the information processing apparatus 101. Note that the input interface 102 for accepting an operation from the user and the output interface 107 (and the display unit 108), to be described later, for screen output may be implemented by a single device such as a touch panel. For example, a software keyboard including keys such as numerical value input keys, a mode setting key, an enter key, a cancel key, and a power key may be displayed on the display unit 108 so that an input from the user can be accepted via the display unit 108. Note that the output interface 107 may perform control to cause an output unit (not shown) to present information by sound output and vibration output.

The communication unit 109 is formed from a circuit and an antenna for performing communication in accordance with a predetermined wireless communication method, connects to another apparatus such as the communication apparatus 151 which can perform communication in accordance with the same wireless communication method, and executes data communication. The short-range wireless communication unit 110 is a device that includes a circuit and an antenna for executing data communication by wirelessly connecting the information processing apparatus 101 to another apparatus such as the communication apparatus 151 which is present within a predetermined short range. Details of the operations of the communication unit 109 and the short-range wireless communication unit 110 will be described later.

The communication apparatus 151 includes, in one example, a ROM 152, a RAM 153, a CPU 154, a print engine 155, a communication unit 156, and a short-range wireless communication unit 157. Note that these blocks are connected to each other by using, for example, an internal bus. Note that the arrangement of these blocks is merely an example, and the communication apparatus 151 may include blocks other than those shown in FIG. 1. The plurality of blocks shown in FIG. 1 may be integrated into a single block or a single block may be divided into two or more blocks. That is, the communication apparatus 151 can have an arbitrary arrangement within the range in which the processing, which is to be described later, can be executed.

The CPU 154 is a system control unit and controls the overall communication apparatus 151. The RAM 153 is formed from, for example, a DRAM (Dynamic RAM) requiring a backup power supply. The RAM 153 is also used as the main memory and the work memory of the CPU 154, can be used as a reception buffer for temporarily saving a print job received from the information processing apparatus 101, and can be used when saving various kinds of information. In addition, the RAM 153 can temporarily store, for example, image data, a print command, and the like received from the information processing apparatus 101 and the like. Since data is held in the RAM 153 by supplying a backup power supply, important data such as program control variables and the like can be stored without volatizing them. The ROM 152 stores permanent data such as control programs and data tables, an OS program, and the like which are to be executed by the CPU 154. In this embodiment, each control program stored in the ROM 152 is used to perform software execution control such as scheduling, task switching, interrupt processing, and the like under the management of the embedded OS stored in the ROM 152. A memory area that stores data, such as the setting information of the communication apparatus 151, the management data of the communication apparatus 151, and the like, which are required to be held even when power supply is not performed can also be arranged in the ROM 152.

The print engine 155 includes a motor, sensors, a printhead, ink tanks, mechanisms, and the like. The print engine 155 performs, based on information stored in the RAM 153 or a print job received from the information processing apparatus 101, image formation on a recording medium such as paper by using a recording material such as ink and outputs a printing result.

The communication unit 156 has the same functions as the above-described communication unit 109. The short-range wireless communication unit 157 has the same functions as the short-range wireless communication unit 110 of the information processing apparatus 101. Details of the operations of the communication unit 156 and the short-range wireless communication unit 157 will be described later.

Note that the communication apparatus 151 includes an input unit (not shown) formed by a mechanical switch button or the like, and is configured to be able to accept a user input of power supply control, simple setting, and the like. In addition, the communication apparatus 151 includes a simple display unit (not shown) formed using an LED (Light Emitting Diode) or the like, and is configured to be able to display, by the display unit, a state concerning the power supply, communication, printing, and the like of the communication apparatus 151.

Details of communication executed between the information processing apparatus 101 and the communication apparatus 151 will be described next. The communication includes communication between the communication unit 109 of the information processing apparatus 101 and the communication unit 156 of the communication apparatus 151, and communication between the short-range wireless communication unit 110 of the information processing apparatus 101 and the short-range wireless communication unit 157 of the communication apparatus 151. The communication by the communication unit 109 and the communication unit 156 can be executed even if the distance between the apparatuses is relatively long. The communication unit 109 and the communication unit 156 can operate as communication devices of wireless LAN complying with, for example, the IEEE802.11 standard series. Wireless communication by the communication unit 109 and the communication unit 156 can be used to transmit/receive a relatively large quantity of data when, for example, transmitting image data from the information processing apparatus 101 to the communication apparatus 151. On the other hand, the communication by the short-range wireless communication unit 110 and the short-range wireless communication unit 157 can be executed only when the distance between the apparatuses is relatively short. In this embodiment, the short-range wireless communication unit 110 and the short-range wireless communication unit 157 comply with the BLE (Bluetooth Low Energy) standard. Wireless communication by the short-range wireless communication unit 110 and the short-range wireless communication unit 157 can be used to transmit/receive a relatively small quantity of data.

The communication unit 109 of the information processing apparatus 101 and the communication unit 156 of the communication apparatus 151 are wirelessly connected via the external access point 131 complying with, for example, a wireless LAN communication standard common to the communication units. When wireless connection is established between the communication unit 109 and the communication unit 156, a state in which wireless communication can be executed between the information processing apparatus 101 and the communication apparatus 151 is obtained. Note that the access point 131 is, for example, a device such as a wireless LAN router, and is a device that constructs a network and/or decides a channel to be used in the network.

Note that when the communication unit 156 of the communication apparatus 151 is functioning as an access point of a wireless LAN, the communication unit 109 of the information processing apparatus 101 may wirelessly be connected to the access point to establish the wireless connection between the communication units. Alternatively, the communication unit 109 of the information processing apparatus 101 may operate as an access point, and the communication unit 156 of the communication apparatus 151 may operate as a terminal to establish wireless connection. Further, both the information processing apparatus 101 and the communication apparatus 151 may operate as terminals to perform inter-terminal communication. Note that each of the communication unit 109 and the communication unit 156 may include hardware serving as an access point or a terminal and may be configured to permanently execute the functions. They may have a capability of dynamically switching these functions and using them. Furthermore, the communication unit 109 and the communication unit 156 may, for example, selectively execute a first mode in which they are connected via an access point and a second mode in which the self-apparatus functions as an access point and is directly connected to another apparatus, or may execute the modes in parallel. If the communication unit 109 and the communication unit 156 operate in the second mode, they can be connected to an external apparatus based on unique SSIDs (Service Set Identifiers) and a path phrase.

Note that each of the communication unit 109 and the communication unit 156 may have a capability of operating in accordance with a wireless communication method of a wireless LAN complying with the IEEE802.11 standard series, as described above, or may have a capability of operating in accordance with another wireless communication method. For example, the communication unit 109 and the communication unit 156 may have a capability of operating in accordance with, for example, a standard such as Bluetooth® (in one example, of a version before version 3.0).

The short-range wireless communication unit 110 of the information processing apparatus 101 and the short-range wireless communication unit 157 of the communication apparatus 151 establish wireless connection and execute wireless communication by a wireless communication method different from that of the communication unit 109 and the communication unit 156. The short-range wireless communication unit 110 and the short-range wireless communication unit 157 can be connected without intermediating another device, for example, in an environment such as a home or office floor, where the distance between the apparatuses is relatively short. In addition, the short-range wireless communication unit 110 and the short-range wireless communication unit 157 can wirelessly be connected with power consumption less than in the case of the communication unit 109 and the communication unit 156. In this embodiment, by such short-range wireless communication, the information processing apparatus 101 and the communication apparatus 151 transmit/receive their statuses and/or the above-described SSIDs, path phrases, and the like.

(BLE Communication)

Communication by the BLE standard and a method of using this communication in this embodiment will be described here. In the BLE standard, generally, a communication apparatus periodically broadcasts an advertising packet. The communication apparatus transmits advertising information including its functions, identification information, and information representing whether it can perform GATT (Generic Attribute Profile) communication to many unspecified communication devices existing on the periphery (within a communicable range). Upon receiving the advertising information, the other devices existing on the periphery of the communication apparatus analyze the advertising information and determine whether to communicate with the communication apparatus. Additionally, the other devices transmit a scan request (SCAN_REQ) and receive a scan response (SCAN_RSP) as a response to the request, thereby acquiring more detailed information about the advertising information. Upon determining that the devices and the communication apparatus can be connected to each other, the other devices establish connection with the communication apparatus, and transition to a state in which mutual communication according to GATT communication can be executed.

Additionally, in the BLE standard, a mutual authentication method between communication apparatuses using the SMP (Security Manager Protocol) is defined. In this embodiment, authentication is performed between the information processing apparatus 101 and the communication apparatus 151 by inputting a common PIN (Personal Identification Number) code. Based on exchange of key information performed in accordance with the success of the authentication between the information processing apparatus 101 and the communication apparatus 151, both apparatuses transition to a pairing state. When the information processing apparatus 101 and the communication apparatus 151 transition to the pairing state, they can encrypt data based on their key information and more securely execute GATT communication. When the information processing apparatus 101 and the communication apparatus 151 transition to the pairing state, they store the key information in a nonvolatile memory together with BD_ADDR (Bluetooth Device Address) that is unique identification information. Accordingly, in connection of the subsequent time, the information processing apparatus 101 and the communication apparatus 151 can perform authentication processing using the key information of the partner apparatus specified based on the identification information in the stored key information.

The outline of communication by GATT (Generic Attribute Profile) of the BLE standard will be described next. GATT defines the two roles of a GATT client and a GATT server based on the transfer source and the transfer destination of the data. The role of the GATT client is to transmit a request to the GATT server and receive a response from the GATT server. The role of the GATT server is to return a response upon receiving a request from the GATT client. In this embodiment, assume that the information processing apparatus 101 is the GATT client and the communication apparatus 151 is the GATT server. That is, the information processing apparatus 101 transmits a request to the communication apparatus 151 (printer) and executes read and write communication of data such as various kinds of data and state information stored in the communication apparatus 151 by GATT communication.

Figure 2:
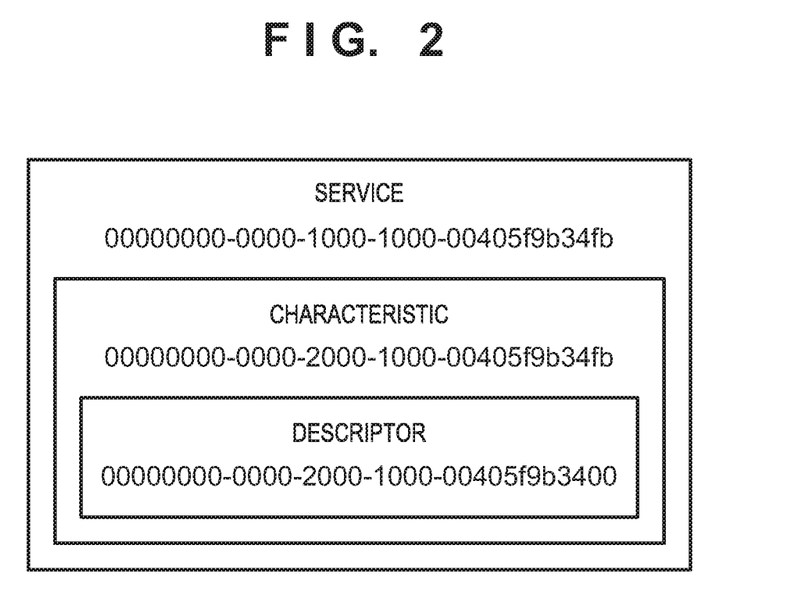
FIG. 2 is a view showing a data format of GATT.

GATT data is formed by three elements called a service, a characteristic, and a descriptor. FIG. 2 shows the relationship of these three elements. A service includes at least one or more characteristics, and a characteristic includes a descriptor. Among these, a characteristic is used for holding user data, and separate pieces of information can be held by using a plurality of characteristics. A descriptor holds additional information of the characteristic as needed. Note that a descriptor need not be present. Note that the size of the data that can be stored in a characteristic is predetermined.

Each of a service, a characteristic, and a descriptor can be identified by a UUID (Universally Unique Identifier) of 32 digits assigned to it. If one service includes a plurality of characteristics, a single UUID is assigned to each characteristic to identify information defined by the BLE standard or information defined for the user. The GATT client designates UUIDs corresponding to the service and the characteristics, thereby executing read/write for a value held for each characteristic. Note that each of the service, the characteristic, and the descriptor can set the attribute of read/write and the attribute of security for the GATT client. For example, whether read/write can be executed is decided in accordance with the read/write attribute set for each of the service and the characteristic. Additionally, a characteristic for which a security attribute is set can be accessed only from a paired device, and communication is performed by encryption.

Figure 3:
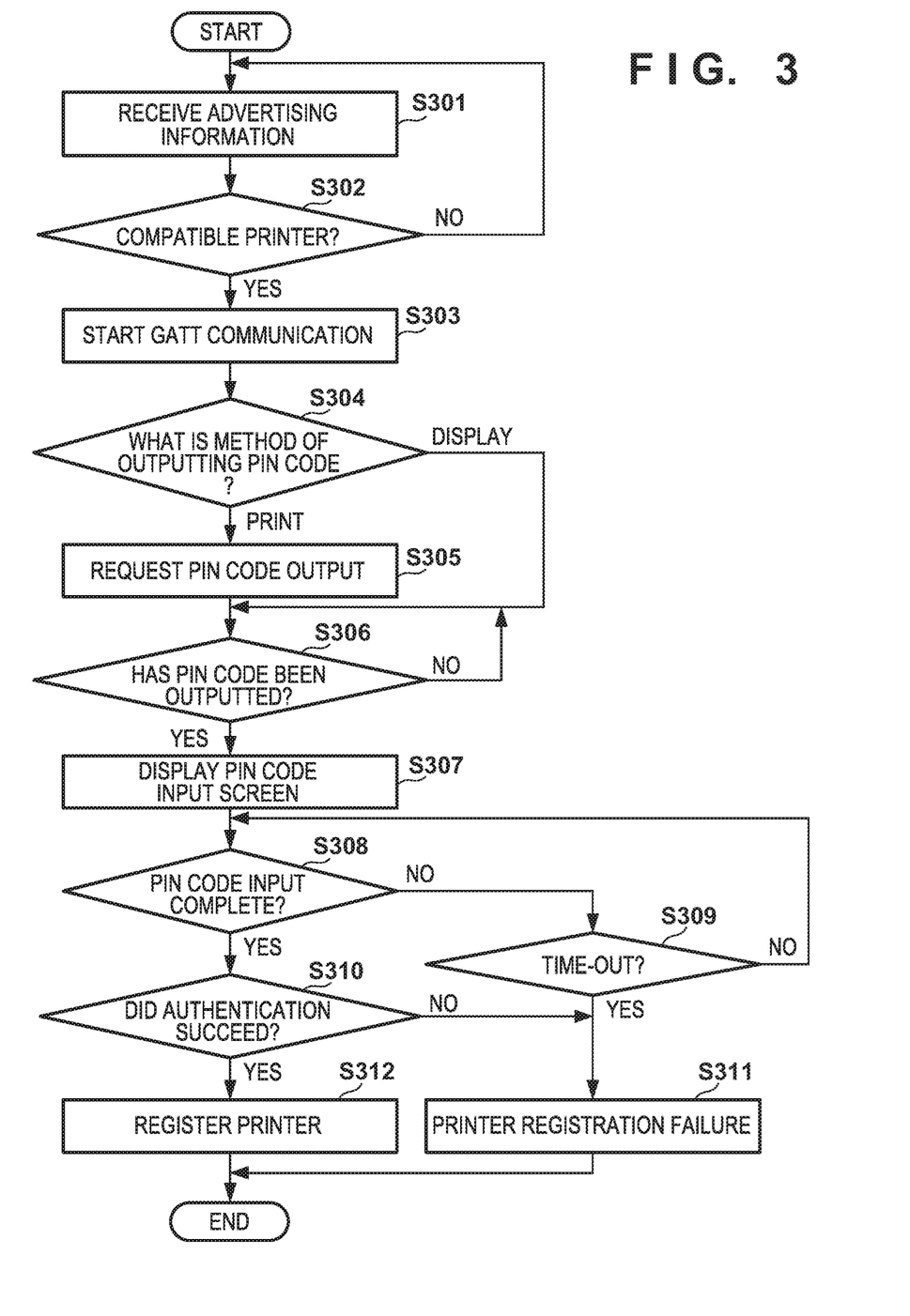
FIG. 3 is a flowchart showing an example of the procedure of processing executed by an information processing apparatus.

Printer registration processing executed by the information processing apparatus 101 for the communication apparatus 151 will be described next in detail with reference to FIG. 3. A print application registers a printer capable of printing in advance and transmits a print job to the registered printer, thereby causing the printer to execute printing. In one example, the CPU 103 executes a predetermined program corresponding to the print application, which is stored in the ROM 104, thereby implementing the processing.

In this processing, first, the information processing apparatus 101 receives advertising information of BLE from a printer on the periphery using the short-range wireless communication unit 110 (step S301). The information processing apparatus 101 transmits a scan request to the printer of the advertising information transmission source and receives a scan response, thereby acquiring more information. Based on the advertising information, the information processing apparatus 101 can discover a printer compatible with printer registration processing using BLE. If a printer compatible with printer registration processing using BLE is not discovered (NO in step S302), the information processing apparatus 101 continuously receives advertising information transmitted from a device on the periphery to continue the search of a printer. Note that if a printer compatible with printer registration processing using BLE is not discovered for a predetermined period, the information processing apparatus 101 may end the processing. Here, assume that the information processing apparatus 101 discovers the communication apparatus 151 as a printer compatible with printer registration processing using BLE (YES in step S302).

The information processing apparatus 101 establishes GATT connection with the discovered communication apparatus 151 and starts GATT communication (step S303). The information processing apparatus 101 acquires, by the GATT communication in step S303, information representing a capability that the communication apparatus 151 can use to output a PIN. In this embodiment, the information processing apparatus 101 confirms, based on the acquired information, whether the communication apparatus 151 has a PIN code display capability or recording (printing) capability, and determines how the communication apparatus 151 can output a PIN code (step S304). Upon determining that the communication apparatus 151 does not have a display capability such as an LCD but has a capability of printing a PIN code, the information processing apparatus 101 requests PIN code output by printing (step S305), and advances the process to step S306. On the other hand, upon determining that the communication apparatus 151 has a display capability such as an LCD, the information processing apparatus 101 advances the process to step S306 without requesting PIN code output by printing.

In step S306, the information processing apparatus 101 determines whether PIN code output is completed. For example, to print a PIN code, a predetermined time such as a time concerning maintenance processing of the printing apparatus or actual print processing is necessary. Hence, printing of the PIN code is not completed immediately after a PIN code output instruction. For the screen display of an LCD or the like as well, a predetermined time may be needed for, for example, return processing from a power saving state, and it may be impossible to output the PIN code immediately. However, if BLE authentication is started before the output of the PIN code, the BLE authentication may be an error because the PIN code is not input within a predetermined time. Hence, the information processing apparatus 101 according to this embodiment starts BLE authentication processing after confirming that the PIN code output is completed (YES in step S306). For example, after confirming that the PIN code output is completed (YES in step S306), the information processing apparatus 101 displays a PIN code input screen on the display unit 108 (step S307). Note that if it is found in advance that the communication apparatus 151 has a screen display capability such as an LCD, and the information of the PIN code can be output immediately after the PIN code output instruction, the process of step S306 may be omitted.

Figure 4:
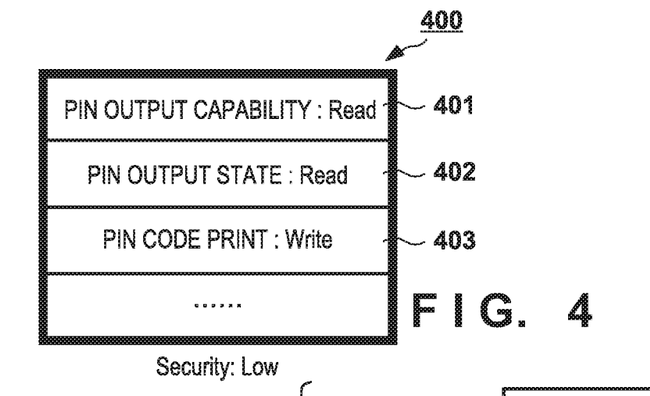
FIG. 4 is a view showing an arrangement example of information held by a communication apparatus.

An example of a characteristic database which is used in steps S303 to S306 of FIG. 3 and for which read processing or write processing is performed by GATT communication will be described here with reference to FIG. 4. This database is held by the communication apparatus 151. PIN-related information 400 is a database of information related to a PIN code, and includes a PIN output capability 401, a PIN output state 402, a PIN code print 403, and the like. Note that the security attribute of the database is "Low", which represents that the database (PIN-related information 400) can be accessed without performing pairing. A read/write attribute is set for each information included in the PIN-related information 400. That is, the PIN output capability 401 and the PIN output state 402, for which "Read" is set, are compatible with read from the outside but are not compatible with write. On the other hand, the PIN code print 403 for which "Write" is set is compatible with write from the outside but is not compatible with read.

The PIN output capability 401 stores information representing the display capability information of the communication apparatus 151. For example, the PIN output capability 401 includes capability information representing whether the communication apparatus 151 (printer) can display a PIN code using the screen of an LCD or the like and whether the communication apparatus 151 can print a PIN code. In step S303, the information processing apparatus 101 reads out the PIN output capability 401, and specifies whether the communication apparatus 151 has a screen display capability or a print output capability as a capability of presenting a PIN code. Note that a BLE-compatible printer is assumed to have at least one of the screen display capability and the print output capability, and the PIN output capability 401 is assumed to store information representing at least one of methods capable of outputting a PIN code. Note that the screen display and printing are merely examples, and the PIN code may be output by another method. For a printer compatible with PIN code output by this method, information representing that the printer is compatible with the method is stored in the PIN output capability 401. Note that the information stored in the PIN output capability 401 may dynamically be changed, and the capability information may be changed in accordance with the state of the printer. A description will be made assuming that the information processing apparatus 101 acquires the PIN output capability 401 by GATT communication. However, the information may be acquired by communication other than GATT communication. For example, the communication apparatus 151 may transmit advertising information including the PIN output capability 401. In this case, the information processing apparatus 101 receives the advertising information, thereby recognizing how the communication apparatus 151 can output a PIN code.

The PIN output state 402 stores information representing whether presentation of a PIN code to the user is completed by screen display processing or print processing of the communication apparatus 151. The PIN output state 402 can also store information representing an error state if printing of the PIN code is not normally performed due to, for example, a defective recording material, a failure in the printer, a fault in the display function, or the like. Note that if the communication apparatus 151 has a screen display function in which output of the PIN code is completed immediately after the PIN code output instruction, information representing whether screen display processing is completed may not be stored in the PIN output state 402. In this case, the PIN output state 402 may store a value representing that PIN code presentation to the user is completed. In step S306, the information processing apparatus 101 can determine, based on the PIN output state 402, whether PIN code output is completed.

The PIN code print 403 is a characteristic that accepts a PIN code print instruction. When the PIN code print 403 accepts write of predetermined data from the information processing apparatus 101 by BLE communication, the communication apparatus 151 prints the PIN code on a recording medium such as a sheet. For example, in step S305, the information processing apparatus 101 writes predetermined data in the PIN code print 403, thereby instructing the communication apparatus 151 to print the PIN code.

For example, a printer that does not have a screen display function sets the PIN output state 402 to a value representing a PIN code non-output state until the PIN code is printed. A printer having a screen display function sets the PIN output state 402 to a value representing a PIN code non-output state until screen display of the PIN code is completed. Accordingly, in the processing shown in FIG. 3, the information processing apparatus 101 waits without advancing to the process of step S307. If the PIN code output is normally completed, the printer sets the PIN output state 402 to a value representing that the PIN code has already been output. Then, based on confirming that the PIN output state 402 is set to the value representing that the PIN code has already been output, the information processing apparatus 101 advances to the process of step S307.

In step S307, as described above, the information processing apparatus 101 causes the display unit 108 to display a PIN code input screen and starts authentication processing of BLE. Note that when printing the PIN code, in a state in which the PIN code cannot normally output due to a defective recording material (ink), a defective recording medium (sheet), or the like, the communication apparatus 151 can set information representing the state to the PIN output state 402. In addition, when displaying the PIN code on a screen, in a state in which the PIN code cannot normally output because, for example, hardware such as an LCD is OFF, the communication apparatus 151 can set information representing the state to the PIN output state 402. This allows the information processing apparatus 101 to notify the user that the communication apparatus 151 cannot normally output the PIN code. The information processing apparatus 101 may display a screen concerning a user operation (handling method) for allowing the communication apparatus 151 to output the PIN code. For example, when notified of a defective recording material or recording medium, or a state in which the power supply of screen display hardware is OFF, the information processing apparatus 101 displays a screen configured to promote to replenish the recording material or recording medium or power on the screen display hardware. When a user operation is performed in accordance with the screen display, the communication apparatus 151 can be set in a state in which the PIN code can be output. If PIN code output is completed by, for example, a user operation, the communication apparatus 151 sets information representing that the PIN code output is completed to the PIN output state 402. Hence, the information processing apparatus 101 displays a PIN code input screen, and authentication processing of BLE is started.

Figure 5A:
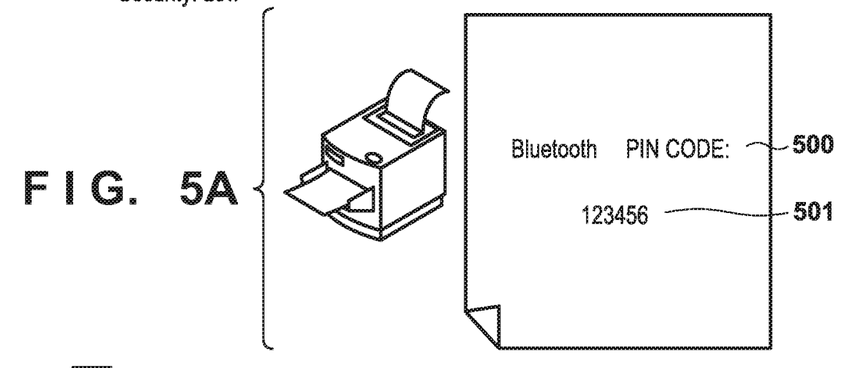
FIG. 5A is a view showing output of a PIN code by printing.
Figure 5B:
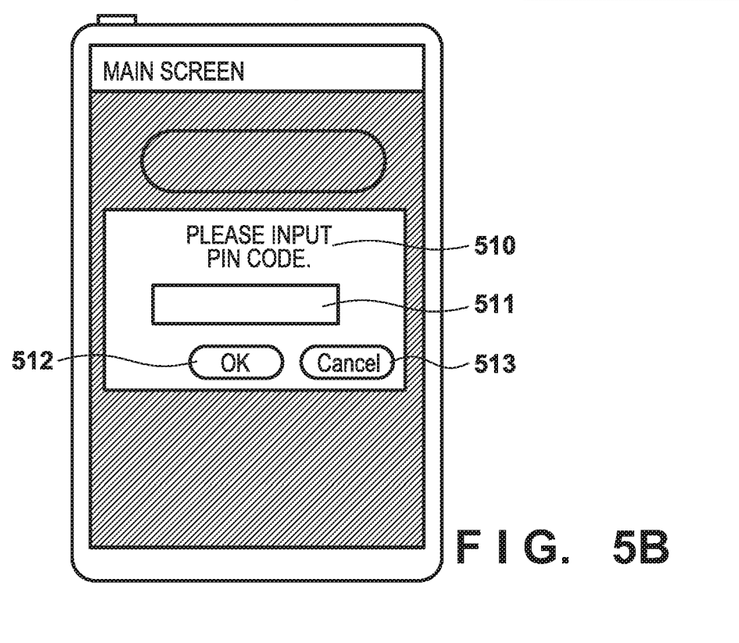
FIG. 5B is a view showing an example of a PIN code input screen.

The outline of a procedure of outputting a PIN code by printing and accepting the PIN code by the information processing apparatus 101 will be described here with reference to FIGS. 5A and 5B. FIG. 5A shows an example in which print output of PIN code information by the communication apparatus 151 is performed. As shown in FIG. 5A, the communication apparatus 151 prints information 500 representing that the information is a PIN code and a PIN code 501 on a recording medium. Note that this is merely an example, and, for example, only the PIN code 501 may be printed. In accordance with completion of print output of the PIN code information, the communication apparatus 151 sets the PIN output state 402 to a value representing a PIN code output completion state. The information processing apparatus 101 can confirm the completion of the output of the PIN code by periodically accessing the PIN output state 402. For example, the information processing apparatus 101 sends a polling signal at a predetermined period and acquires, as a response, information set in the PIN output state 402. Based on confirming that the output of the PIN code is completed, the information processing apparatus 101 displays a PIN code input screen 510 as shown in FIG. 5B. The PIN code input screen 510 includes, for example, an input field 511, an OK button 512, and a cancel button 513. When the user inputs the value of the printed PIN code 501 to the input field 511, and clicks the OK button 512, pairing processing is executed between the information processing apparatus 101 and the communication apparatus 151.

Upon detecting the input of the above-described OK button 512 (YES in step S308), the information processing apparatus 101 executes authentication processing using the input PIN code by the short-range wireless communication unit 110, and determines whether authentication has succeeded (step S310). If a normal PIN code is input, pieces of key information necessary for pairing are generated in the information processing apparatus 101 and the communication apparatus 151 and exchanged, and authentication succeeds. Upon confirming that the authentication is normally completed (YES in step S310), the information processing apparatus 101 stores the generated pairing information in a nonvolatile memory together with the identification information of the communication apparatus 151, thereby registering the printer (step S312). When the printer is registered, registration processing is ended.

In step S307, the information processing apparatus 101 starts measuring a time-out time by the BLE standard in accordance with the start of authentication processing of BLE. Even if the PIN code is not input (NO in step S308), the information processing apparatus 101 waits for the input of the PIN code before a predetermined time elapses from the start of the authentication processing (NO in step S309). On the other hand, based on the elapse of a predetermined time from the start of authentication processing (YES in step S309) without input of the PIN code (NO in step S308), the information processing apparatus 101 determines that the authentication processing has failed (step S311), and ends the registration processing. Even if the authentication has failed because of, for example, input of a wrong PIN code (NO in step S310), the information processing apparatus 101 determines that the authentication processing has failed (step S311), and ends the registration processing. The time-out confirmation processing and the PIN code authentication in steps S308 to S310 are performed by the same method as the conventional method. These processes are generally executed in the short-range wireless communication unit 110.

As described above, instead of starting authentication processing of BLE immediately after a PIN code output instruction, the information processing apparatus 101 suspends the start of authentication processing of BLE until output of the PIN code is completed. According to this, if the time until the output of the PIN code is long, time-out of authentication processing of BLE can be prevented from occurring due to the time needed for the output. In addition, since the time from the output of the PIN code to the time-out of the authentication processing of BLE can sufficiently be ensured, the time until the user inputs the PIN code can sufficiently be ensured. Furthermore, if the communication apparatus 151 is in a state in which it cannot output the PIN code, the information processing apparatus 101 displays a guidance for a user operation for eliminating the state, thereby reliably presenting the PIN code. These can improve the user convenience.

Figure 6:
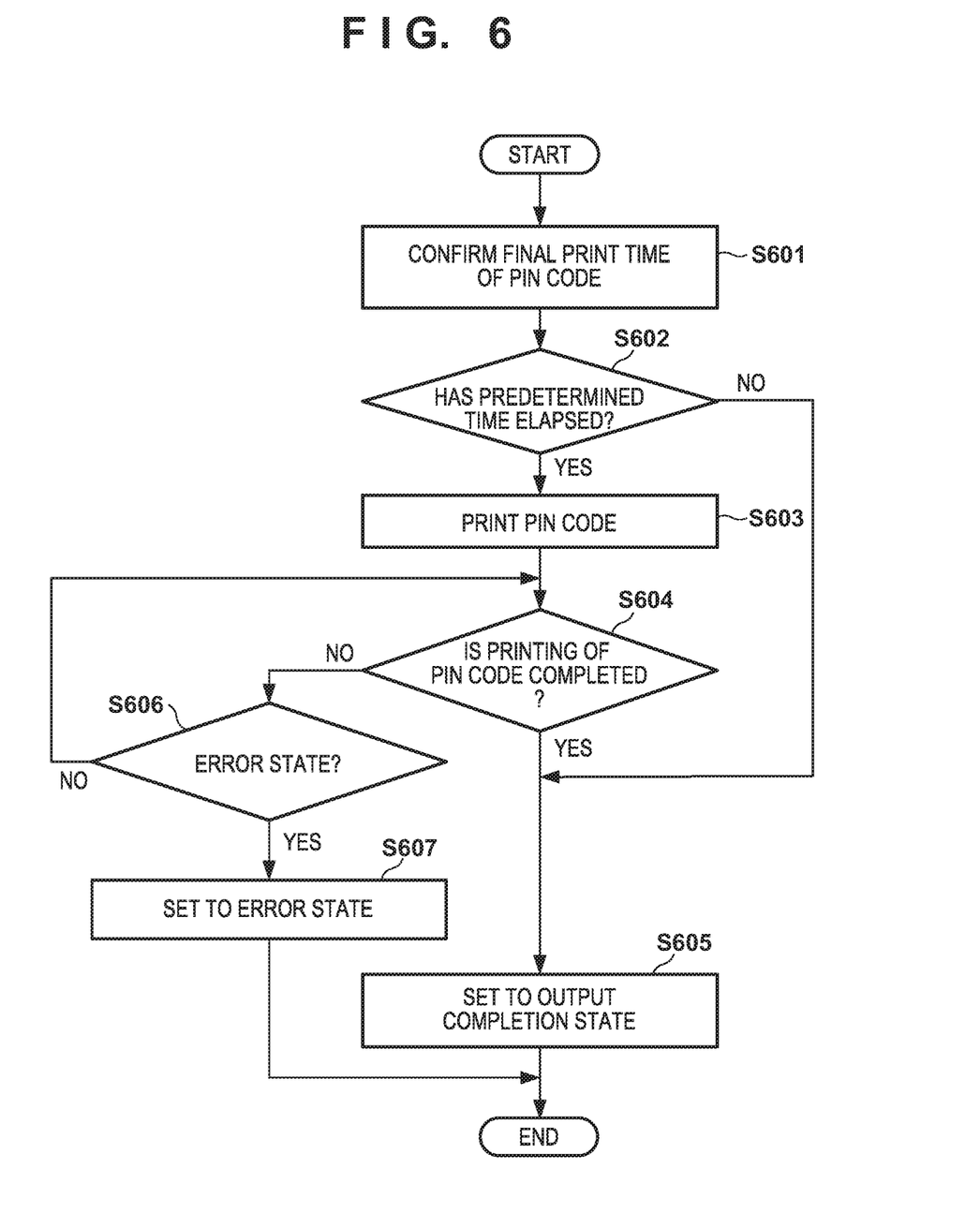
FIG. 6 is a flowchart showing an example of the procedure of processing executed by the information processing apparatus.

Note that the communication apparatus 151 may be configured to independently execute printing of the PIN code in accordance with a manual operation of the user and store the time information of printing of the PIN code. In addition, the communication apparatus 151 may be configured to change the PIN code stored in the communication apparatus 151 by a user operation. In this case, in the communication apparatus 151, the output of the PIN code may be completed at a point of time before the PIN code output is requested by the information processing apparatus 101 in step S305 of FIG. 3. In this case, the communication apparatus 151 may omit processing of reprinting the PIN code. FIG. 6 shows an example of the procedure of processing by the communication apparatus 151 in a case in which such processing is executed. FIG. 6 shows an example of the procedure of PIN code output processing on the side of the communication apparatus 151 in a case in which a PIN code output request is received from the information processing apparatus 101 in step S305 of FIG. 3.

The communication apparatus 151 starts the processing shown in FIG. 6 based on the issuance of the PIN code output request from the information processing apparatus 101 by GATT communication. The communication apparatus 151 confirms the information of the time (final print time) at which the PIN code was printed finally, which is stored inside (step S601), and compares the final print time with the current time, thereby determining whether a predetermined time has elapsed from the final print time (step S602). Upon determining that the predetermined time has elapsed from the final print time (YES in step S602), the communication apparatus 151 executes printing of the PIN code (step S603). The communication apparatus 151 confirms the print processing state during print processing of the PIN code. Upon confirming that printing of the PIN code is normally completed (YES in step S604), the communication apparatus 151 sets a value representing that the output of the PIN code is completed to the above-described PIN output state 402, transitions to an output completion state (step S605), and ends the processing. Note that even in a case in which the predetermined time has not elapsed from the final print time, if the PIN code is changed after the final printing of the PIN code, the communication apparatus 151 executes printing of the PIN code as in the case in which the predetermined time has elapsed from the final print time. On the other hand, if the predetermined time has not elapsed from the final print time (NO in step S602), and the PIN code is not changed, the communication apparatus 151 does not execute printing of the PIN code. The communication apparatus 151 sets a value representing that the output of the PIN code is completed to the above-described PIN output state 402, transitions to an output completion state (step S605), and ends the processing.

During the time when printing of the PIN code is not completed (NO in step S604), the communication apparatus 151 confirms whether an error has not occurred (step S606). If it is confirmed that an error state has occurred due to a trouble in the hardware of the printer or a shortage of the printing material or printing medium (YES in step S606), the communication apparatus 151 sets a value representing the error state to the PIN output state 402 (step S607), and ends the processing. The information processing apparatus 101 may read out the PIN output state 402 and display, based on the contents of the error state, a guidance for a user operation to be executed to eliminate the state, as described above.

As described above, the communication apparatus 151 can confirm the time at which the PIN code was finally printed and omit print processing of the PIN code for a PIN code output request issued immediately after the output. Accordingly, since the time needed for pairing processing can be shortened, the user convenience can be improved.

Note that an explanation has been made above with focus placed on pairing using a PIN code. However, the present invention is not limited to this. That is, the above-described method can be applied when arbitrary predetermined information other than a PIN code is used to execute arbitrary predetermined processing other than pairing between two apparatuses. In this case, a first apparatus confirms whether a second apparatus has completed output of predetermined information used to execute predetermined processing between the first apparatus and the second apparatus. Based on confirming that the output of the predetermined information by the second apparatus is completed, the first apparatus can perform display control to cause a display device to display a screen used to start the predetermined processing. Hence, unless information used to execute predetermined processing between two apparatuses is output, a screen used to start the predetermined processing is not displayed, and the predetermined processing is not started. That is, if time-out is set for the predetermined processing, the occurrence of the time-out caused when the predetermined information is not output can be prevented, and user convenience can be improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-068065, filed on Mar. 29, 2019 which is hereby incorporated by reference herein in its entirety.

What is claimed is:

1. An information processing apparatus comprising:
   one or more processors; and
   one or more memories that stores a computer-readable instruction that causes, when executed by the one or more processors, the information processing apparatus to:
   confirm whether a communication apparatus has completed printing of authentication information used to execute authentication processing between the information processing apparatus and the communication apparatus; and
   cause a display to display an input screen used to accept an input of the authentication information based on confirming that the communication apparatus has completed the printing of the authentication information.

2. The apparatus according to claim 1, wherein the authentication processing is executed within a predetermined time from the display of the input screen in accordance with inputting the authentication information on the input screen by the information processing apparatus.

3. The apparatus according to claim 2, wherein the authentication processing is processing of starting measuring a time-out time based on the display of the input screen.

4. The apparatus according to claim 1, wherein the authentication processing is pairing processing in Bluetooth Low Energy.

5. The apparatus according to claim 1, wherein
   the communication apparatus has a function of printing the authentication information by recording the authentication information on a recording medium, and
   in the confirming, if output of the recording medium on which the authentication information is recorded is completed, it is confirmed that the communication apparatus has completed the printing of the authentication information.

6. The apparatus according to claim 1, wherein
   the communication apparatus holds, as information readable by the information processing apparatus, information representing whether the printing of the authentication information is completed, and
   in the confirming, the information held by the communication apparatus is read out, thereby confirming whether the communication apparatus has completed the printing of the authentication information.

7. The apparatus according to claim 6, wherein
   the communication apparatus can hold, as the readable information, information representing that the communication apparatus is in a state in which the authentication information cannot be printed, and if the information representing that the communication apparatus is in the state is read out, the information processing apparatus causes the display to display a screen concerning an operation for allowing the communication apparatus to print the authentication information.

8. The apparatus according to claim 1, wherein the information processing apparatus does not cause the display to display the screen used to start the predetermined processing until it is confirmed that the output of the predetermined information is completed.

9. A control method executed by an information processing apparatus, comprising:
confirming whether a communication apparatus has completed printing of authentication information used to execute authentication processing between the information processing apparatus and the communication apparatus; and
causing a display to display an input screen used to accept an input of the authentication information based on confirming that the communication apparatus has completed the printing of the authentication information.

10. The method according to claim 9, wherein the authentication processing is executed within a predetermined time from the display of the input screen when the information processing apparatus inputs the authentication information on the input screen.

11. The method according to claim 10, wherein the authentication processing is processing of starting measuring a time-out time based on the display of the input screen.

12. The method according to claim 9, wherein the authentication processing is pairing processing in Bluetooth Low Energy.

13. The method according to claim 9, wherein
the communication apparatus has a function of printing the authentication information by recording the authentication information on a recording medium, and
in the confirming, if output of the recording medium on which the authentication information is recorded is completed, it is confirmed that the communication apparatus has completed the printing of the authentication information.

14. The method according to claim 9, wherein
the communication apparatus holds, as information readable by the information processing apparatus, information representing whether the printing of the authentication information is completed, and
in the confirming, the information held by the communication apparatus is read out, thereby confirming whether the communication apparatus has completed the printing of the authentication information.

15. The method according to claim 14, wherein
the communication apparatus can hold, as the readable information, information representing that the communication apparatus is in a state in which the authentication information cannot be printed, and
if the information representing that the communication apparatus is in the state is read out, the information processing apparatus causes the display to display a screen concerning an operation for allowing the communication apparatus to print the authentication information.

16. The method according to claim 9, wherein the input screen used to accept the input of the authentication information is not displayed on the display until it is confirmed that the printing of the authentication information is completed.

17. A non-transitory computer-readable storage medium that stores a program configured to cause a computer provided in an information processing apparatus to:
confirm whether a communication apparatus has completed printing of authentication information used to execute authentication processing between the information processing apparatus and the communication apparatus; and
perform control to cause a display to display an input screen used to accept the authentication information based on confirming that the communication apparatus has completed the printing of the authentication information.

* * * * *